May 24, 1955  F. J. KUCKLICK  2,708,804
FISHING LURE ACTUATOR
Filed Oct. 7, 1952  3 Sheets-Sheet 1
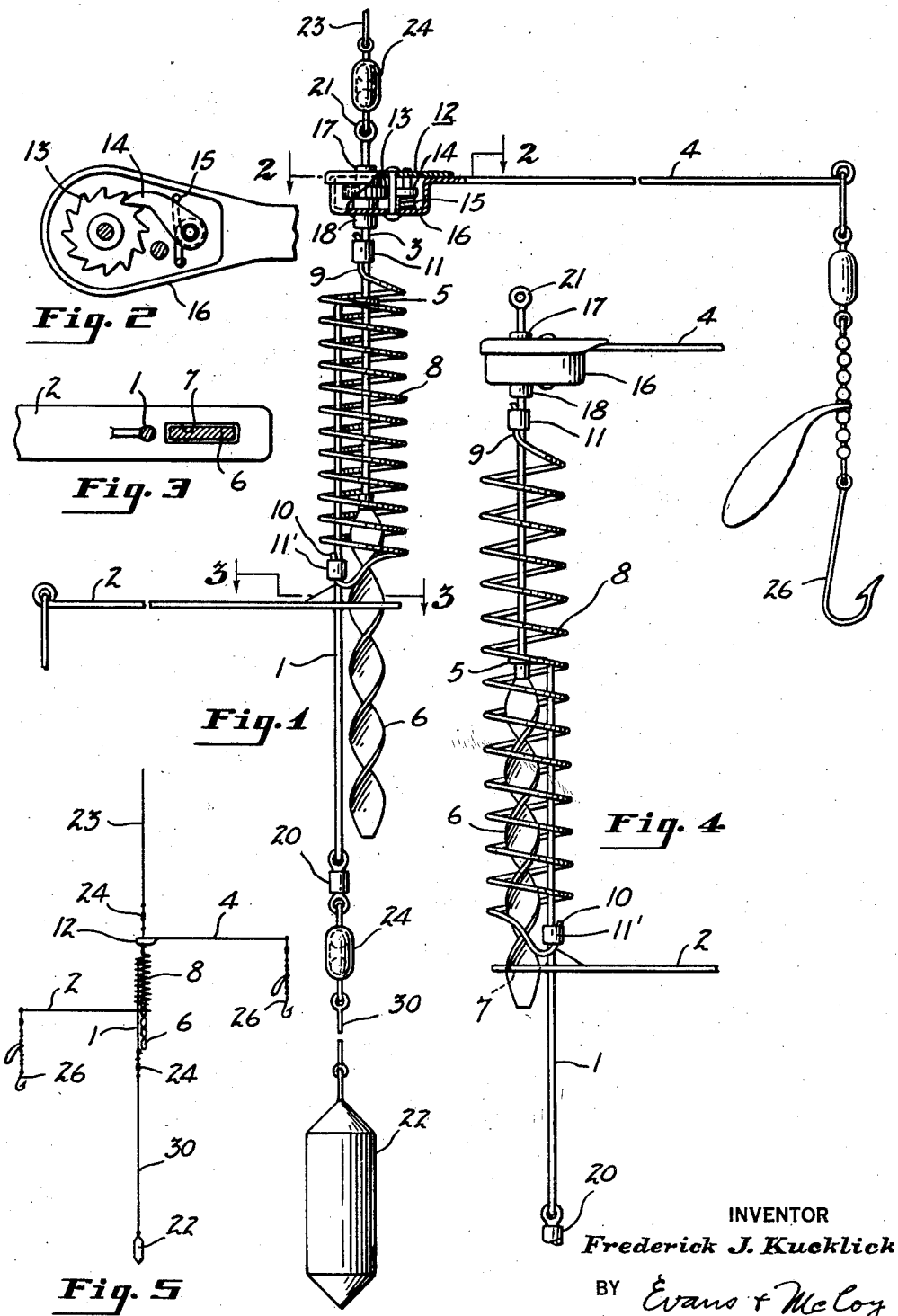
INVENTOR
Frederick J. Kucklick
BY Evans & McCoy
ATTORNEYS

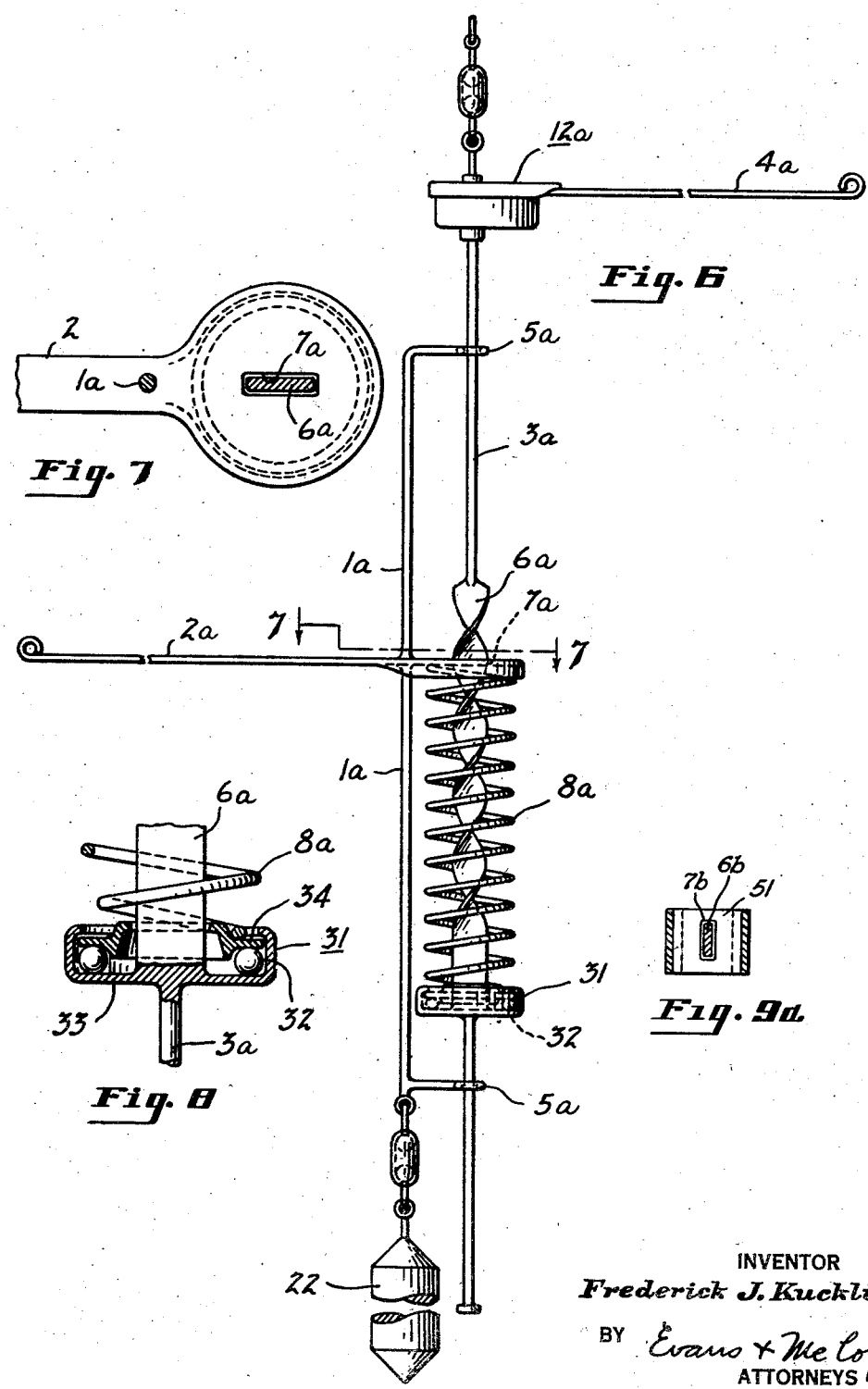

May 24, 1955

F. J. KUCKLICK 2,708,804

FISHING LURE ACTUATOR

Filed Oct. 7, 1952

INVENTOR
Frederick J. Kucklick
BY Evans + McCoy
ATTORNEYS 2,708,804
Patented May 24, 1955

2,708,804

FISHING LURE ACTUATOR

Frederick J. Kucklick, Olmsted Falls, Ohio

Application October 7, 1952, Serial No. 313,478

6 Claims. (Cl. 43—26.1)

This invention relates to an apparatus for actuating fishing lures and particularly to such apparatus which is capable of causing a continuous rotary motion of fishing lures when a simple up and down reciprocating movement is applied to the fishing line to which the apparatus is attached.

When trolling in the great lakes and rivers, it is customary for the lure to be moved within a few feet of the bottom of the lake. This procedure covers much territory and usually results in many snags because of foreign matter, rocks, etc., with which the lure comes into contact with resultant loss of the lure. In many instances, such as in ice fishing, particularly, it is impossible to provide a movement of the fishing lure by some mechanism.

It is an object of the present invention to provide apparatus to which artificial or natural fishing lures may be attached which may be actuated to provide continuous movement of the lure in a horizontal plane by only vertical movement of the line to which the lure is attached.

It is another object of the present invention to provide such a fishing lure which may be actuated as long as the line is given the required up and down movement.

It is a further object of the present invention to provide fishing lure actuating apparatus which is suitable for fishing through holes in the ice where horizontal movement of the line cannot take place.

Other objects will be apparent from the following description of the invention as illustrated by the accompanying drawings in which:

Figure 1 is an elevational view partly in section of a lure actuating apparatus embodying the present invention;

Fig. 2 is a detail view as seen from the line 2—2 of Fig. 1;

Fig. 3 is a fragmentary sectional view along the line 3—3 of Fig. 1;

Fig. 4 is also a side elevational view of the apparatus of Fig. 1 shown with the spring thereof in the most extended position as when the line has been relatively rapidly pulled up or tensioned to the topmost position of the actuating cycle;

Fig. 5 is a diagrammatic view of the actuating device of the present invention showing lures and sinker attached as in Fig. 1 and providing an idea of the suitable relative proportions of the actuating device;

Fig. 6 is an elevational view of a modified form of actuator embodying the present invention;

Fig. 7 is a sectional view taken along the line 7—7 of Fig. 6 as it appears in the direction of the arrows shown;

Fig. 8 is an enlarged sectional view of the lower bearing portion of the device of Fig. 6;

Figures 9, 10, 11:
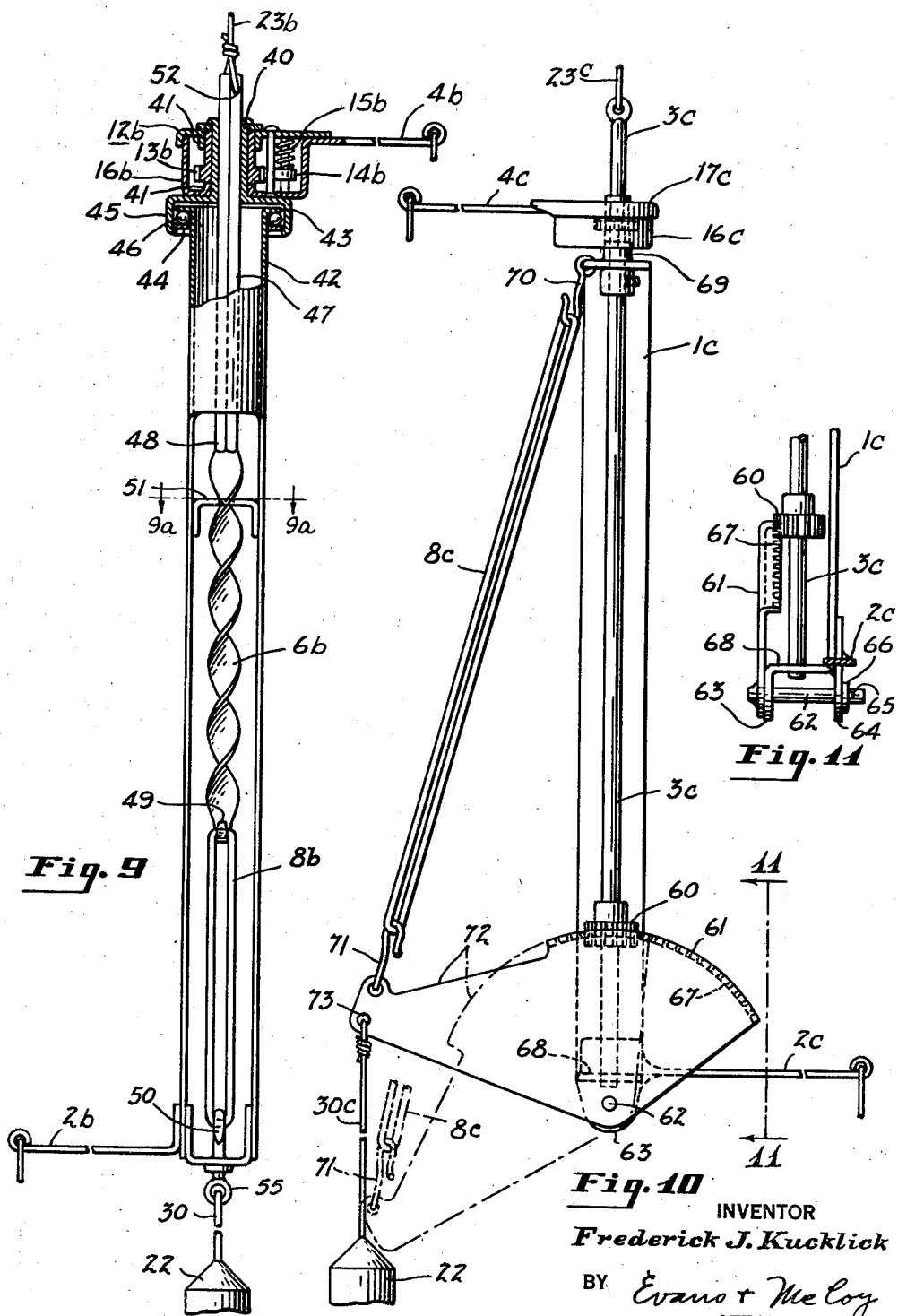
Fig. 9 is an elevational view of another modified form of device embodying the present invention.

Figure 9A as shown in the drawing is a sectional view on the line 9a—9a of Figure 9.

Fig. 10 is an elevational view of still another modified form of the present invention; and Fig. 11 is a sectional view on the line 12—12 of Fig. 10.

Referring more particularly to the drawings in which like parts are designated by like numerals of reference throughout the several views, the actuating device of the present invention comprises (a) a frame member 1 having attached thereto one of the lure carrying arms 2; (b) a shaft member or relatively rotatable member 3 rotatably carried by said frame member for rotatively actuating an arm 4 extending out from the axis, to which arm a lure may also be attached when said shaft is rotated in at least one direction; (c) means for causing rotative movement of said shaft member relative to said frame member when tension is applied to or relieved from the fishing line; (d) resilient means for resetting said rotative movement causing means when tension is relieved or applied to said line; and (e) means such as a ratchet and pawl for permitting relatively free rotative movement of one of said arms relative to said shaft member and said frame member in but a single direction of rotation. The shaft member 3 is journaled in at least one of the journal portions 5 of the frame member to permit relative rotation of the shaft member and said frame member. The means for causing relative rotative movement of the lure carrying arm may be a spiral 6 in combination with the slot 7 on the frame member through which the spiral 6 passes. Relative rotation of the frame member and shaft occurs upon relative vertical movement of said frame member 1 or slot 7 and the spiral 6 on the shaft member 3. Resilient means such as the spring 8 is provided for resetting rotative actuating means between the shaft member and the frame member when the tension of the line is changed.

The resilient means as shown in Fig. 1 has one end portion 9 rigidly attached to the shaft member 3 and another end portion 10 rigidly attached to the frame member 1 by bands 11 and 11' respectively.

The free wheeling means such as the ratchet means 12 between one of the members, preferably the shaft member 3 and the arm rotatively moved by such member, is an important feature of the present invention. The free wheeling or ratchet means 12 permits substantially free movement of the arm 4 relative to the shaft 3 in one direction and prevents or substantially prevents relative movement of these two members in the other direction. The ratchet or free wheeling mechanism 12 comprises a ratchet wheel 13 which may be attached rigidly to the shaft member 3, and the pawl 14 together with a suitable ratchet spring 15 adapted to maintain the pawl in contact with the ratchet. The pawl 14 is attached to the housing 16 which directly carries the arm 4. The housing 16 has journals 17 and 18 to permit relatively free rotative movement on the housing of the shaft 3. Suitable means such as the link 20 and loop 21 are provided for attaching the relatively rotatable members of the actuating device to a sinker or weight 22 and line 23 respectively. When the actuating device is attached to the line, swivel means 24 is provided between the sinker and the lure actuating device of the present invention and between the line and the lure actuating device to prevent twisting of the line portions or sinker upon rotation of the component parts of the device.

In the form shown in Figs. 1 to 5 inclusive, the spring 8 is normally in the retracted or unextended position shown in Fig. 1. It is extended by applying tension on the line 23 which is resisted by the sinker or weight 22 so that it assumes the elongated position shown in Fig. 4. During the elongation, the frame member 1 and the arm 2 are rotated relative to the shaft member 3 and the arm 4. When the tension is relieved on the line 23, the spring 8 becomes retracted again to the position of Fig. 1 causing reverse movement of the shaft 3. Because of the free wheeling means, one of the rotative movements of the shaft 3 does not cause like rotative movement of the arm 4 with the result that the arm 4 may continue by its inertia force to move in the direction of the initial movement. Therefore, by applying continuous reciprocating up and down movement to the line 23 to periodically tension the lure actuator between line 23 and the portion of the connecting line 30, one obtains a movement of the arms 2 and 4 in directions opposite to each other. The sinker 22 should be sufficiently heavy to provide the required force.

The arms 2 and 4 are of sufficient length and are disposed in planes of rotation spaced sufficiently apart so that the lures 26 attached to the arms do not become entangled. In the modification shown in Figs. 6, 7 and 8, the spring 8a is normally in the elongated position. One end of the spring 8a may bear against a portion of the frame member 1a and the other end may bear against a suitable bearing 31 on the shaft member 3a to permit free rotation of the shaft member 3a relative to the spring 8a. The entire rotative forces between the frame 1a and the shaft 3a is provided by the reaction between the spiral 6a and the slot 7a during a portion of the reciprocating cycle applied through the line. The bearing 31 may comprise balls 32 carried in a suitable race 33 and a relatively rotative member 34 against which the one end portion of the spring 8a bears. The portions of the device corresponding to portions of the device of Figures 1–5 are designated by corresponding numerals with the suffix "a" addded thereto.

In modifications of Figures 9 and 10 the arms 2b and 4b and 2c and 4c, respectively, rotate in planes of revolution a fixed distance apart. The spring or resilient resetting means is of rubber-like material such as the rubber band 8B and 8C respectively in Figures 9 and 10.

Referring particularly to the modification of Figure 9, the housing 16b is journaled on the bearing portion 41 of the tubular sleeve 40. The sleeve 40 is rotatively carried by one end portion of the tubular frame member 42. As shown the frame member 42 has a flange portion 43 which cooperates with the bearing disc 44 carried by the enlarged portion 45 of the sleeve 40 to form a suitable race for the ball bearings 46. The tubular opening through the sleeve 40 is of rectangularly shaped cross section to slidably receive the upper portion shaft 47 of the shaft 48 which comprises the upper portion 47 and spiral 6b. The shaft 48 has means such as a hook 49 for fastening one end of the spring or resilient member 8b thereto. The opposite end portion of the spring 8b is attached to the lower portion of the frame 42 by appropriate means such as the hook 50. A suitable slot 7b within the portion 51 of the frame member is provided to cooperate with the spiral 6b to cause relative rotating movement between shaft 6b and the frame 42 to which the arm 2b is rigidly attached when the shaft portion 47 is slidably freely moved with reference to frame member 42. The upper line portion containing a suitable swivel (not shown) is attached to the upper portion of the shaft 47 by suitable means such as opening 52. The lower line portion 30 which should also contain suitable swivels and which is attached to the sinker 22 is connected to the frame through the eye 55 which is rigidly carried by the frame 42. By alternatively applying and releasing tension between line portions 23b and 30 of Figure 9, the shaft 48 is oscillated longitudinally with reference to the frame 42 causing relative rotative movement of these members. The free wheeling device consisting of the ratchet wheel 13b which is rigidly carried on the sleeve 40, the pawl 14b and spring 15b which is attached to the housing 16b and which is rotatably carried on the sleeve 40 permits free rotation of the sleeve 40 relative to the housing in one direction only. Movement of the shaft 48, the portion 47 of which is longitudinally slidable but not rotatable in said sleeve, in the other direction causes non-slip engagement of the pawl and the ratchet wheel and therefore causes relative rotation of the arm 4b relative to the frame 42 and arm 2b.

In the modification shown in Figure 10 the means for causing relative rotation of the shaft member 3c and the frame 1c comprises the pinion 60 which is rigidly carried on shaft 3c and which is rotatively carried by the frame 1c, and the arcuately shaped rack 61 which is welded to the shaft 62 that is in turn pivotally journaled in the arms 63 and 64 attached to the lower portion of the frame member 1c. The shaft 62 is provided with a pin 65 and washer 66 to prevent axial movement thereof relative to the frame 1c, and therefore, to maintain proper meshing of the teeth 67 of the rack with the teeth of the pinion 60. The lower end of the shaft 3c is journaled for rotative movement in the horizontal portion 68 of the frame 1c. It is also journaled in the boss 69 of the upper portion of the frame 1a. The spring or resilient member 8c which is preferably of rubber has one end attached to the frame member through the hook 70 and another end attached to the rack through the hook 71. The line 30c to which the sinker 22 is attached through suitable swivels (not shown) is also attached to the arm 72 of the rack 61 through the opening 73 which like the hook 71 is displaced from the axis of the shaft 62. Rotative movement of the shaft relative to the frame 3c is caused by intermittent up and down movement of the line 23 relative to line portion 30 to cause (when tension is applied) the rack to assume the position shown by the dotted lines of Figure 10. Release of tension permits the contraction of spring or resilient resetting means 8c and causes the rack to pass to the position shown by the solid line. The oscillative rotative movement of the shaft with the aid of the free wheeling means within the housing 16b causes relative rotational movement of the arms 2c and 4c in opposite directions.

It is to be understood that in accordance with the provisions of the patent statutes variations and modifications of the specific devices herein shown and described may be made without departing from the spirit of the invention.

What I claim is:

1. Fishing lure actuating device suitable for attaching to a fishing line comprising a frame member, a shaft member carried by said frame member and rotatable relative thereto, an arm carried by and rotatable with said frame member, a second arm carried by and extending out from said shaft member and rotatable with said shaft member when said shaft member is rotated in one of the two rotatable directions, means, part of which is on said shaft member, for causing relative rotative movements of said shaft member and said frame member when tension applied through the line between said frame member and said shaft member is varied, and means permitting free rotation of said second arm relative to said shaft member when said shaft is rotated in the other of said directions, both of said arms extending out from the axis of rotation of said shaft member and being spaced axially of said shaft whereby when lures are attached to each of said arms said lures are rotated in axially spaced paths.

2. A device according to claim 1 further characterized in that said means for causing relative rotational movement of said shaft member and said frame member comprises a rack moveably carried by said frame member, a pinion carried by said shaft and rotatable therewith and meshing with teeth of said rack, and resilient reset means for resetting said rack to original position when the said tension applied in said line is suitably varied.

3. The device according to claim 2 wherein said rack has an integral arm, is arcuately shaped and is pivotally carried by said frame and wherein said resilient reset means is of rubber-like material and has one end portion connected to said arm at a point spaced from the pivot point of said rack and another end connected to said frame member.

4. A device according to claim 1 wherein said means for causing rotative movement of said shaft member and said frame member comprises a spiral on said shaft and a tension spring between said shaft and said frame member.

5. A device according to claim 1 wherein said shaft member has a spiral portion and is slidable longitudinally relative to said frame member and wherein a spring is disposed between said frame and said shaft to reset said shaft to initial position after release of tension between said shaft and frame members as applied through a line having one portion connected to said shaft member and another portion connected to said frame member.

6. A device according to claim 1 wherein the axial separation between said arms is fixed regardless of tension on said line.

References Cited in the file of this patent

UNITED STATES PATENTS

| | | |
|---|---|---|
| 465,162 | Coe | Dec. 15, 1891 |
| 1,251,810 | Oehler | Jan. 1, 1918 |
| 2,087,222 | Matthews | July 13, 1937 |
| 2,122,826 | Gegerfeldt | July 5, 1938 |